June 17, 1941.  W. R. WICKERHAM ET AL  2,246,333
SYNCHROTIE SYSTEM
Filed Sept. 9, 1939   3 Sheets-Sheet 1

WITNESSES:
E. A. McCloskey
Nw. C. Goome

INVENTORS
William R. Wickerham
and Harry C. Brunner.
BY
Paul E. Friedemann
ATTORNEY Patented June 17, 1941

2,246,333

UNITED STATES PATENT OFFICE 2,246,333

SYNCHROTIE SYSTEM

William R. Wickerham, Swissvale, and Harry C. Brunner, Forest Hills, Pa., assignors to Westinghouse Electric & Manufacturing Company, East Pittsburgh, Pa., a corporation of Pennsylvania Application September 9, 1939, Serial No. 294,108

6 Claims. (Cl. 172—293)

Our invention relates to motor control systems and more particularly to systems of control for interconnecting a plurality of motors to effect synchronous operation.

Many applications require that two motors, operating on the same load or separate loads and disposed at some considerable distance apart, operate at the same speed. A notable example is the operation of a vertical lift bridge operated by one or more motors disposed at each end of the bridge. To make certain that two such motors or two groups of such motors operate in absolute synchronism so that the bridge be maintained absolutely level, that is, lifted at the same speed at each end, wound rotor induction motors are used, which, when being started, have their primaries simultaneously connected to an alternating current supply and which have their secondary windings connected to each other in opposition. Such connection is known in the trade as a synchro-tie connection.

Heretofore, the practice has been either to apply three-phase power directly to the primary windings of the motors, or to apply the three-phase power in steps from single phase to open terminals, to three phase.

With such conventional starting schemes, when the rotors are at the instant of interconnection in such position that the generated secondary voltages happen to be out of phase, the current drawn from the line is in excess of normal, increasing with the magnitude of the phase displacement, and reaching a maximum of six to ten times at 180° displacement, depending on the design of the motors.

Difficulty has been experienced on vertical lift bridges employing power synchro-tie systems between the pair of independent hoisting motors at each end of the span. The power supply to bridges is generally limited because of the usual isolated locations of the bridges, and excessive currents introducing excessive voltage losses that interfere with successful performance.

One broad object of our invention is to keep the current drawn from a power supply by a synchro-tie system during starting at a relatively low value.

Another object of our invention is to so select the synchro-tie interconnection that the secondary windings of the induction motors at the instant of interconnection are not out of phase above a given phase angle.

The objects of our invention hereinbefore recited are merely illustrative. Other objects and advantages will become more readily apparent from a study of the following specification when made in conjunction with the accompanying drawings, in which.

Figure 1:
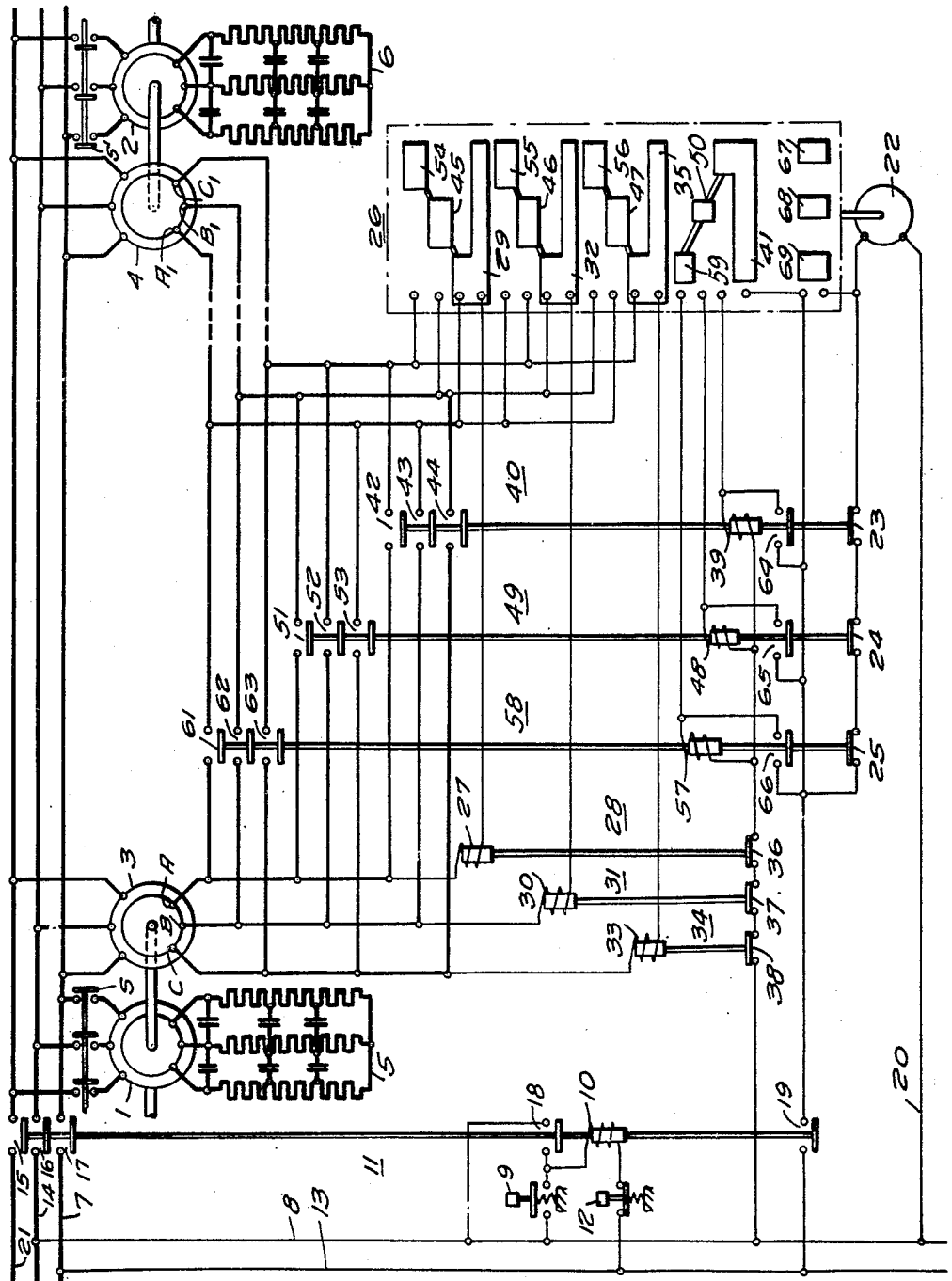
Figure 1 is a diagrammatic illustration of one embodiment of our invention.

With our schemes of control, we can prevent the current in-rush, at starting, from increasing beyond more than half the maximum possible. This we accomplish by arranging to connect the terminals of one rotor winding to those terminals of the other rotor winding that have the minimum phase displacement. This means that the rotors cannot be connected with rotors displaced more than approximately sixty electrical degrees, since a given phase of one motor will always be within sixty degrees of one of the phases of the other motor.

Ordinarily the circulating currents in a synchro-tie system for two motors substantially equally loaded are not excessive to maintain synchronous operation between the two motors. It is, therefore, possible to maintain two relatively large similarly designed motors in synchronism by the use of considerably smaller similarly designed tie motors connected in synchro-tie relation disposed on the respective shafts of the larger motors. We, therefore, show two main motors 1 and 2 coupled to suitable loads, at the respective ends of a lift bridge, provided on their respective shafts with the motors 3 and 4.

Motors 1 and 2 are wound rotor motors having speed control rheostats 5 and 6 for varying the speed and torque of these motors. The contactors, or drum controllers for effecting the shunting of corresponding resistor sections of the respective rheostats are preferably synchronized so that the speeds of the two motors 1 and 2, since they will usually be loaded substantially equally, are through their entire operating range substantially the same, even though there be no provision made for providing absolute synchronous operation. Just how such synchronized speed and torque control of the motors 1 and 2 is obtained constitutes no part of our invention. It is, of course, apparent that our invention could be used with the rheostat operating motors, if motors were used for that purpose.

The tie motors are chosen big enough for their purpose and may be relatively small with reference to the size of the main motors, but the upper capacity of the tie motors in relation to the main motors is not limited.

Probably the clearest understanding of the novel and advantageous features of our control may be had from a study of the operation of our control.

To start the motors 1, 2, 3 and 4, the attendant depresses the starting switch 9, thereby establishing a circuit from bus 14 through conductor 8, starting switch 9, actuating coil 10 of the circuit breaker 11, the stop switch 12, and conductor 13 to bus 7. Operation of the circuit breaker closes switches 15, 16, 17, 18 and 19. Closure of switches 15, 16 and 17 connects the primary windings of motors 3 and 4 to buses 7, 14 and 21 and these motors will remain stationary but begin to generate secondary voltages.

Closure of switch 18 provides a holding circuit for coil 10 and closure of switch 19 establishes a circuit from energized conductor 8 through conductor 20, motor 22, back contact members 23, 24, 25 and switch 19 to energized conductor 13.

The motor 22 thus starts to operate the drum controller 26. Assuming the drum of the controller 26 is, at the instant the motor 22 starts, in the position shown, then three circuits are established, one from slip ring A through coil 27 of phase responsive relay 28, controller segment 29 to slip ring $A_1$, a second from slip ring B through coil 30 of phase responsive relay 31, controller segment 32, to slip ring $B_1$, and a third from slip ring C through coil 33 of phase responsive relay 34, controller segment 35 to slip ring $C_1$.

The coils 27, 30 and 33 are each so calibrated or designed that they pick up the relay contact members only when the secondary windings of motors 3 and 4 to which the coils are connected are out of phase by more than sixty electrical degrees.

Assuming that the secondary windings to which the respective coils 27, 30 and 33 are at the time connected are no more than sixty degrees out of phase, then the voltages on the coils will be too low to cause the relays 28, 31 and 34 to operate and as a result contact members 36, 37 and 38 remain closed. Presently the motor 22 will have moved the controller 26 to establish a circuit from energized conductor 8 through contact members 36, 37 and 38, the actuating coil 57 of synchro-tie contactor 58, controller segments 59 and 41, and switch 19 to energized conductor 13. Operation of synchro-tie contactor 58 closes switches 61, 62 and 63 and thus completes the synchro-tie connection, connecting slip ring A to $A_1$, slip ring B to $B_1$ and slip ring C to $C_1$. The circuit breakers or switches S and S' are then operated.

If the particular secondary windings to which coils 27, 30 and 33 were connected by the controller segments 29, 32 and 35 were more than sixty electrical degrees out of phase, one or all of the contact members 36, 37 and 38 are opened and operation of the synchro-tie contactor 58 is prevented.

A moment later the controller 26 connects coils 27, 30 and 33 differently. The three circuits for these coils may now be traced, one from slip ring A through coil 27, controller segments 29 and 45 to slip ring $B_1$, a second from slip ring B through coil 30, controller segments 32 and 46 to slip ring $C_1$, and a third from slip ring C through coil 33, controller segments 35 and 47 to slip ring $A_1$. If the particular secondary windings to which the coils 27, 30 and 33 are now connected are less than sixty degrees out of phase, contact members 36, 37 and 38 remain closed and coil 48 of the synchro-tie contactor 49 is energized through controller segments 50 and 41 connected to conductor 13. Contact members 51, 52 and 53 are thus closed and synchro-tie connection is completed. However, in this instance slip rings A, B and C are connected, respectively, to slip rings $B_1$, $C_1$ and $A_1$.

If the in-phase relation is not yet obtained, then either one or all the contact members 36, 37 and 38 are opened and energization of coil 48 is prevented. When this condition obtains, the controller 26 keeps operating and an instant after the second trial was made three new circuits for coils 27, 30 and 33 are made. One circuit may be traced from slip ring A through coil 27, controller segments 29, 45 and 54 to slip ring $C_1$, the other from slip ring B through coil 30, controller segments 32, 46 and 55 to slip ring $A_1$, and the third from slip ring C through coil 33, controller segments 35, 47 and 56 to slip ring $B_1$.

If two unsuccessful trial circuits are considered, then the third must be correct, because a given phase of one motor will always be within sixty degrees of one of the three phases of the other motor. Contact members 36, 37 and 38 thus remain closed and a circuit is established from energized conductor 8 through contact members 36, 37 and 38, actuating coil 39 of synchro-tie contactor 40, controller segment 41, and switch 19 to energized conductor 13. Switches 42, 43 and 44 are thus closed and the synchro-tie connection is completed.

It will be noted, from the foregoing discussion, that fundamentally our scheme provides for the making of three "check," or trial, connections, and the first trial connection that divulges a voltage across a given pair of slip rings corresponding to an angle of sixty degrees or less between phases, results in the interconnection of the secondary buses in that relation.

It will be noted that each synchro-tie contactor not only operates the switches for completing the synchro-tie connection, but also stop switches for the motor 22 and switches for establishing holding circuits for the synchro-tie contactors.

If synchro-tie contactor 40 completes the synchro-tie connection, it immediately establishes its own holding circuit through contact member 64 and also stops the motor by the opening of switch 23 and the movement of segment 67 to open circuit position. The synchro-tie contactors 49 and 58 accomplish similar results through switches 24 and 65, and 25 and 66, respectively, coacting with segments 68 and 69, respectively.

Figure 2:
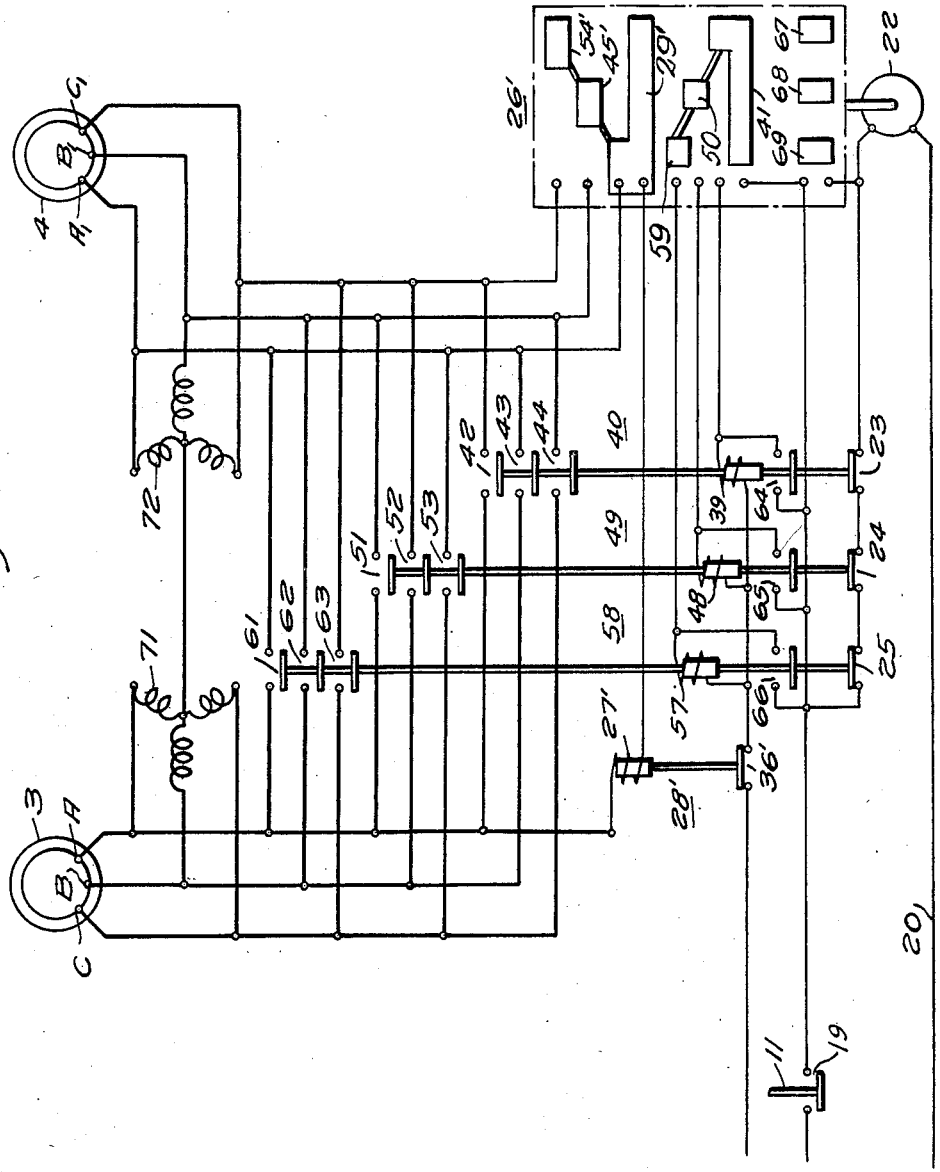
Fig. 2 is a diagrammatic showing of a modification of our invention.

In the modification shown in Fig. 2, we provide a pair of impedances 71 and 72 connected to each other at their neutral points and connected to the slip rings as shown. This interconnection provides an artificial neutral so that only one phase "check" or phase responsive relay, as 28', is needed.

After the motors 3, 4 and 22 are energized, coil 27' has one terminal connected to slip ring A and its other terminal is successively connected to slip rings $A_1$, $B_1$ and $C_1$ through the segments 29', 45' and 54'. These three trial connections will find one connection that fails to operate relay 28'. This occurs when the secondary windings of the motors are no more than sixty degrees out of phase. Contact members 36' remain closed and one of the coil 39, 48 and 57 of the synchro-tie contactors is energized depending on the position of segments 41, 50 and 59. The synchro-tie connection is thus completed exactly as with the embodiment shown in Fig. 1.

Figure 3:
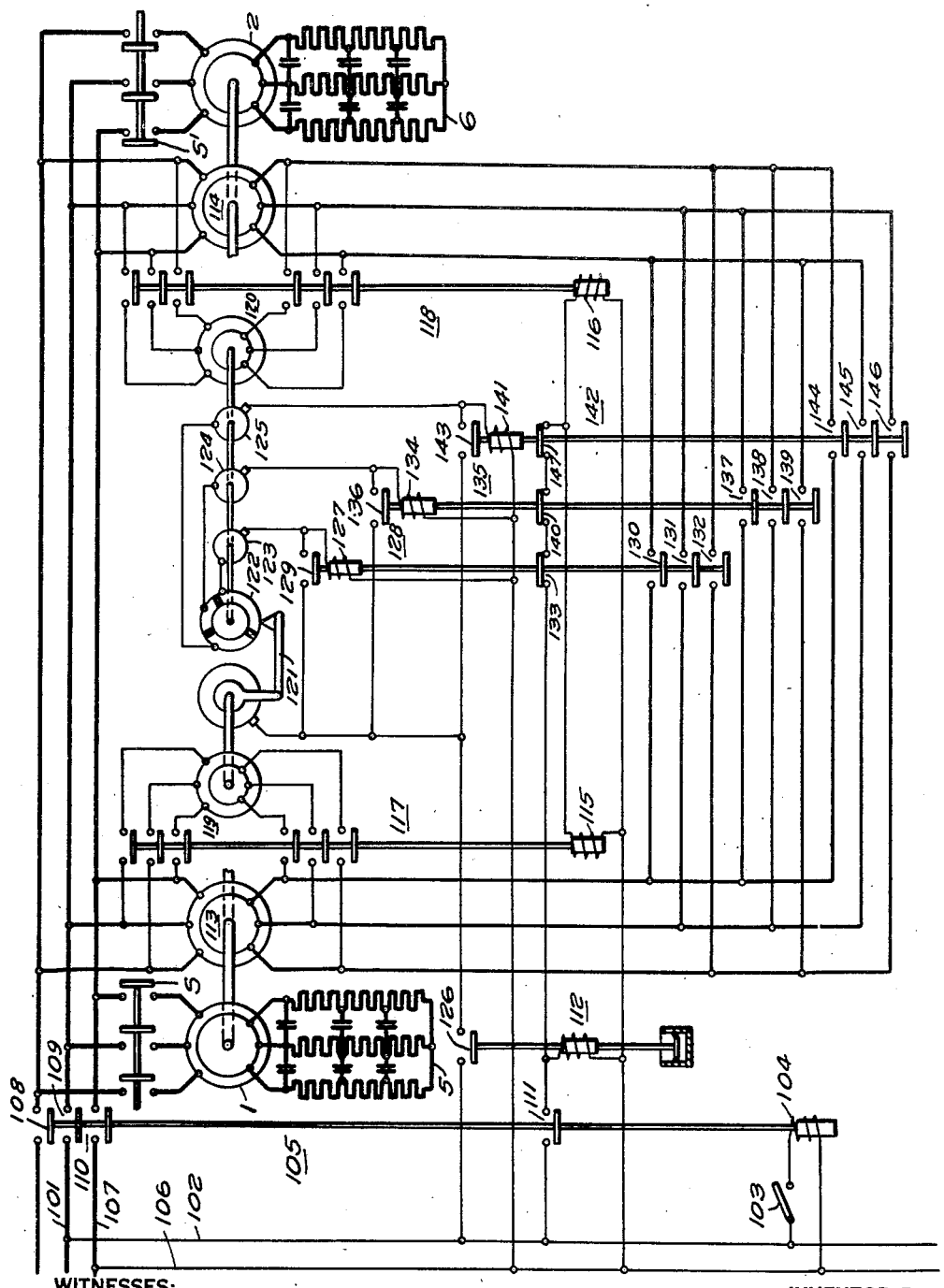
Fig. 3 is a still further modification of our invention, also shown diagrammatically.

In the modification shown in Fig. 3, we use a pair of small auxiliary motors 119 and 120 provided with rotational dampeners to effect the completion of the synchro-tie connection. A clear understanding of this modification can probably be had from a study of a sequence of operation. To start the operation, the attendant operates starting switch 103, whereupon a circuit is established from bus 101 through conductor 102, starting switch 103, actuating coil 104 of the main switch 105 and conductor 106 to the bus 107. Operation of the main switch 105 closes the switches 108, 109, 110 and 111.

Closure of the switch 111 establishes an energizing circuit for the time limit relay 112 which closes its contact members 126 after a relatively small predetermined interval of time. Closure of switches 108, 109 and 110 connects the tie motors 113 and 114 to a source of alternating current supply. However, since these motors have their secondaries on open circuit, they do not rotate.

The closure of switch 111 also establishes a circuit from the energized conductor 102 through switches 111, 133, 140 and 147 through the actuating coils 115 and 116 of the contactors 117 and 118 to the energized conductor 106. Operation of the contactors 117 and 118 connects the primary windings of the motors 119 and 120 to the primary windings of the motors 113 and 114 and connects the secondary windings of the motors 119 and 120 to the secondary windings of the motors 113 and 114. Since motors 113 and 114 are at rest, the motors 119 and 120 merely move relative to each other by an angular motion dependent upon the phase position of the secondary windings of the motors 113 and 114. In other words, the movement is just sufficient to produce an in-phase relation with the secondary windings of the tie motors 113 and 114.

After closure of the contact member 126, a circuit is established from energized conductor 102, through contact member 126, through the rotatable brush 121, one of the contact segments of the contactor 122 to one of the slip rings 123, or 124, or 125. If the angular movement of the rotors of the motors 119 and 120 is such that the position is as shown for in-phase relation of the secondary windings of the tie motors, then the circuit form the contactor 122 is established through the slip ring 123, actuating coil 127 of the synchro-tie contactor 128 to the energized conductor 106. Operation of the synchro-tie contactor 128 closes the contact members 130, 131 and 132, thereby interconnecting the secondary windings of the tie motors 113 and 114 so as to be in-phase or at least not out of phase by more than 60°.

The operation of the synchro-tie contactor also opens the switch 133, thereby deenergizing the coils 115 and 116 to thus disconnect the auxiliary small motors 119 and 120. Thereafter the main circuit breakers for the main motors 1 and 2 may be operated either by automatic means set in operation by the operation of the synchro-tie contactor 128 or by any other automatic or manual control means.

It is, of course, apparent that if the in-phase relation is such that slip ring 124 is placed in the circuit, then the coil 134 of the synchro-tie contactor 135 is energized and this synchro-tie contactor makes the proper in-phase connection at the contact members 137, 138 and 139, and also disconnects the auxiliary motors by the opening of the contact member 140.

On the other hand, if slip ring 125 is energized, coil 141 becomes energized and the synchro-tie contactor 142 completes the in-phase synchro-tie connection at contact members 144, 145 and 146, and the auxiliary motors are disconnected by the opening of the contact member 147.

It will be noted that regardless of what synchro-tie contactor is operated, each one is provided with contact members as 129, 136 and 143, respectively, for providing the necessary holding circuits, so that the particular contactor that has been energized remains energized throughout subsequent operation of the main motors and tie motors.

The embodiment and two modifications hereinbefore discussed are merely illustrative of our invention, since it is readily apparent that others, particularly after having had the benefit of the teachings of our invention, can devise other means for completing the synchro-tie connection. We, therefore, wish to be limited only by the scope of the appended claims and such prior art as may be pertinent.

We claim as our invention:

1. In a synchro-tie system, in combination, a pair of tie motors having primary stator windings and polyphase secondary rotor windings, a source of alternating current, means for connecting the primary windings to said source of alternating current, switching means for completing synchro-tie connections between the secondary windings of said tie motors, voltage responsive means adapted to be successively interconnected with different phase windings of the rotors of the tie motors, and means, responsive to the minimum voltage divulged by the successive interconnection, adapted to effect operation of said switching means only when the secondary windings are somewhere near in phase.

2. In a synchro-tie system, in combination, a pair of tie motors having primary windings and three phase secondary rotor windings, a source of alternating current energy, means adapted to connect the primary windings of both motors to said source of alternating current, a relay having an actuating coil, said actuating coil having one of its terminals connected to a given point of the secondary windings of one of the tie motors, means adapted to successively connect the other terminal of said actuating coil to each of the three phases of the secondary winding of the second tie motor, and means responsive to the minimum voltage to which the actuating coil is thus subjected adapted to interconnect the secondary windings in in-phase relation.

3. In a synchro-tie system, in combination, a pair of tie motors having primary windings and three phase secondary rotor windings, a source of alternating current energy, means adapted to connect the primary windings of both motors to said source of alternating current, three electromagnetic contactors adapted respectively to connect the two three phase secondary windings of the tie motors in three different phase relations, energizing circuits for each of said contactors, a controller adapted to sequentially establish partial energizing circuits for said contactors, and a relay, responsive to the minimum voltage between two phase windings of the secondary windings, adapted, in coaction with said controller, to energize the particular contactor that will interconnect the secondary windings so that all the phases are near in phase.

4. In a synchro-tie system, in combination, a pair of tie motors having primary windings and three phase secondary rotor windings, a source of alternating current energy, means adapted to connect the primary windings of both motors to said source of alternating current, three electromagnetic contactors adapted respectively to connect the two three-phase secondary windings of the tie motors in three different phase relations, a controller adapted to selectively effect the establishment of partial energizing circuits for said contactors and means, responsive to the voltage across those pairs of terminals of the respective contactors that is the least in magnitude and coacting with said controller to effect the closing of that contactor having the least voltage between its terminals.

5. In a synchro-tie system, in combination, a pair of tie motors each having primary stator windings, a source of alternating current, means for connecting the source of alternating current to each of the primary windings, and each motor having polyphase secondary rotor windings, electromagnetically operable synchro-tie interconnecting switches equal in number to the number of phases of the rotor windings disposed to interconnect the rotor windings in as many synchro-tie connections as there are phases in the rotor windings, and means interconnected with the rotor windings adapted to energize that particular one of the electromagnetically operable synchro-tie switches having the minimum voltage across its terminals.

6. In a synchro-tie system, in combination, a pair of tie motors each having primary stator windings, a source of alternating current, means for connecting the source of alternating current to each of the primary windings, and each motor having polyphase secondary rotor windings, electromagnetically operable synchro-tie interconnecting switches equal in number to the number of phases of the rotor windings disposed to interconnect the rotor windings in as many synchro-tie connections as there are phases in the rotor windings, an electromagnetically controlled relay, controller means for successively interconnecting said relay in different relations with the phase windings of the secondary windings of the motors whereby said relay will successively be subjected to different voltages depending on the angular displacement of the phases of the secondary windings, the design of the relay being such that it remains deenergized when subjected to the lowest voltage to which it is thus subjected, and means responsive to the deenergized condition of said relay and the operation of said controller means adapted to energize that particular one of the synchro-tie interconnecting switches having the lowest voltage across its terminals.

WILLIAM R. WICKERHAM.
HARRY C. BRUNNER.